United States Patent

[11] 3,578,362

[72] Inventor Brian R. Cauthery
 R.R. #1, Caledon, Ontario, Canada
[21] Appl. No. 802,801
[22] Filed Feb. 27, 1969
[45] Patented May 11, 1971

[54] PIPE ADAPTER
 4 Claims, 3 Drawing Figs.

[52] U.S. Cl. ................................................ 285/110,
 285/332.2, 285/334.4, 285/345, 285/368, 285/423
[51] Int. Cl. ...................................................... F16l 17/02
[50] Field of Search .......................................... 285/110,
 332.3, 113, 106, 238, 230, 231, 334.4, 363, 368,
 345, 332.2, 174, 348, 351, 347, 177, 423; 272/202
 (A)

[56] References Cited
 UNITED STATES PATENTS
2,422,158 6/1947 Wolfram .................... 285/351X

| | | | |
|---|---|---|---|
| 2,507,261 | 5/1950 | Mercier | 285/368X |
| 2,639,169 | 5/1953 | Jones | 285/351X |
| 3,348,862 | 10/1967 | Leopold et al. | 285/174X |
| 3,371,676 | 3/1968 | Mullaney | 285/110X |

FOREIGN PATENTS

| 1,086,073 | 8/1954 | France | 285/332.3 |
|---|---|---|---|
| 273,737 | 5/1914 | Germany | 285/231 |

Primary Examiner—Dave W. Arola
Attorney—George H. Riches

ABSTRACT: An adapter for sealing a plastic pipe to a cast iron bell fitting is provided with an internal dynamic seal to receive the plastic pipe in entered peripheral sealing relation within the adapter, and an axial end seal, with a compression shoulder to accept axial closing forces providing precise positioning of the end seal against a tapered inner surface of the bell fitting.

Patented May 11, 1971

3,578,362

Inventor
Brian R. Cauthery

By

George W. Rekes

Attorney bell end;

PIPE ADAPTER

This invention is directed to a pipe fitting adapter and to a method of securing a plastic pipe in secured sealing relation to a rigid bell fitting. In particular the invention is directed to a rigid coupling adapter to receive a plastic pipe in sealed coupled relation to a cast iron pipe or fitting bell.

The widespread adoption of plastic pipe made of thermoplastic material in integrated pipe systems is limited by the different functional characteristics existing between the plastic pipe fittings and rigid iron fittings to which the pipe must be coupled. The problems which stem from different thermal expansion characteristics of the materials are further complicated by differences in dimensional diameters between pipes of the same nominal size. In particular, the susceptibility of thermoplastic pipe to creep under prolonged and uncontrolled compressive stress makes joining of the two pipe types very difficult. Plastic piping does not lend itself to rigid joints, in view of the inherent absence of rigidity in the plastic pipe. Prior joining arrangements such as bonding or cementing increaser sleeves to the plastic pipe spigot, the wrapping of rubber strips in combination with mechanical compression joints, the attachment of cast stub fittings to the ends of plastic pipes, all present cost, time and performance disadvantages which militate strongly against successful integrated plastic-to-iron systems.

The present invention provides an adapter fitting permitting instant connection of plastic pipe to bell end fittings for iron pipe systems to form pressuretight joints, while permitting the plastic pipe to conform to its own inherent physical characteristics.

Pipe joints made in accordance with the subject invention require minimal field preparation, and provide pressuretight joints which are not sensitive to climatic temperature or moisture variations.

The joining of the subject adapter fittings in dynamic sealing relation to the outer surface of a plastic pipe is effected by means of a deformable O-ring housed in an internal seal recess shaped in accordance with the disclosure set forth in my copending application Ser. No. 802,802 dated Feb. 27, 1969 and utilizing a relatively soft O-ring to permit deformation and provide dynamic sealing in response to system internal pressure, while avoiding creep failure of the plastic pipe.

A transition fitting mountable in sealing relationship with a spigot end and connectable to a mechanical joint flange of a bell fitting, said transition fitting having a trailing end and a leading end, a central bore through said transition fitting, an arcuate hydraulic sealing-ring recess in said bore adjacent the trailing end for the reception therein of deformable elastomeric sealing ring, said arcuate recess being characterized by a relieved surface adjacent the leading end of the transition fitting forming a pressure access annulus, the leading end of the transition fitting having an aggressive taper relative to the taper of the mechanical joint bell into which it is to be inserted, a primary sealing-ring recess at the runout of the aggressive taper and the outer extremity of the leading end for receiving therein a primary hard elastomeric sealing ring, the trailing end being upset to form a transition fitting mounting flange connectable to the mechanical joint flange of the mechanical joint bell, said transition fitting mounting flange having an annular shoulder engageable with the outer face of the mechanical joint flange whereby when the two flanges are clamped together excessive compression of the primary sealing ring is prevented.

The present invention also provides the method of joining a plain-ended plastic pipe to a rigid flanged pipe end of bell form including the steps of applying a radially and axially flexible dynamic seal between the plastic pipe and a rigid adapter to seal the adapter to an outer peripheral portion of the pipe outer surface, securing the adapter in axially aligned relation to a flanged end of a rigid fitting, and applying a predetermined limited, axial compressive load to an elastomeric seal located in fluid pressure containing relation between the rigid adapter and the rigid fitting.

Certain embodiments of the present invention are described, reference being had to the accompanying drawings wherein.

Figure 1:
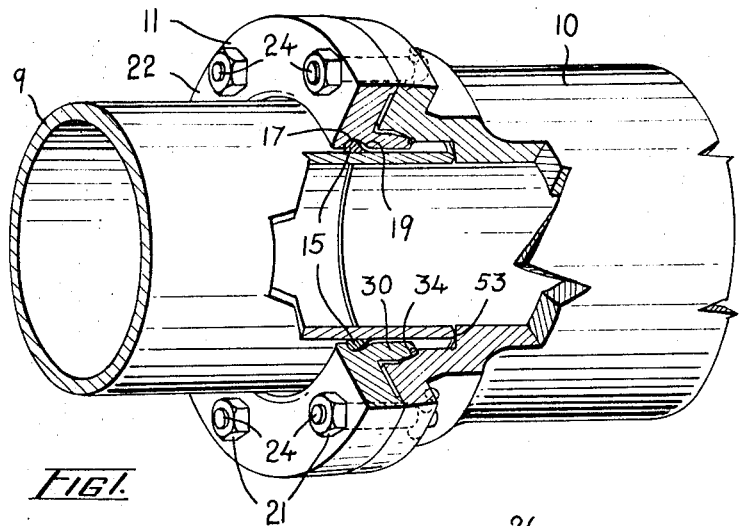
FIG. 1 is a general view in partial section of the subject adapter in assembled relation with a plastic pipe and a fitting bell end.

Referring first to FIG. 1, a plastic pipe 9 is assembled in sealing relation to a pipe or component end fitting 10 by way of the transition fitting or adapter 11, in accordance with this invention.

Figure 2:
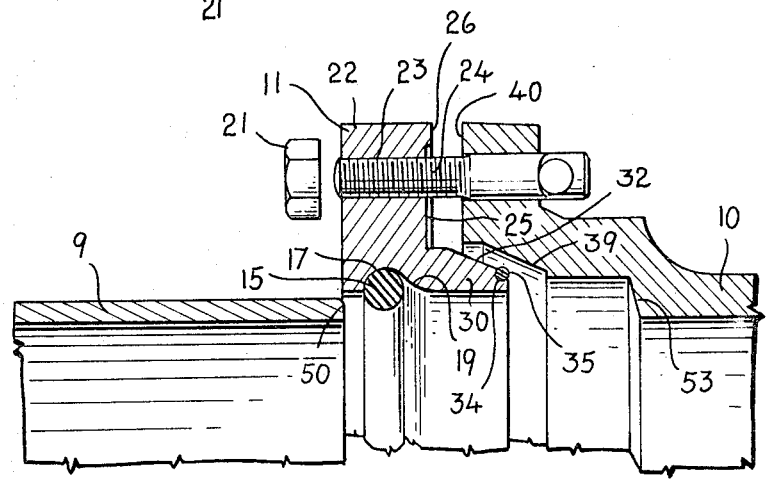
FIG. 2 is a partial diametrical section of the joint combination in partially assembled relation.

Referring to FIG. 2 a soft hydraulic deformable O-ring 15 is located within an annular recess 17 of the adapter 11, the recess 17 having a relieved inner shoulder 19 in accordance with the teaching of my above referenced copending application.

The adapter 11 has a trailing end 8 and a leading end 30. The trailing end 8 is upset to form a flange portion 22 having a plurality of boltholes 23 to receive coupling bolts 24 extending therethrough. The face 25 of flange 22 is relieved, to provide an axially extending shoulder 26 of predetermined axial extent. The leading end 30 of the adapter 11 is cylindrical in shape, having an aggressive tapered male face taper 32 which terminates in an annular nose recess 34 into which a hard rubber O-ring 35 is fitted. An aggressive taper is one in which the male face taper 32 of the adapter 11 has a smaller degree of taper than the opposing female face taper 39 of the bell fitting. In other words, an aggressive taper is one in which the angle of the male face taper 32 is more acute than the angle of the female face 39, thus ensuring a diminishing clearance between the faces as the adapter is inserted. The axial dimension of the shoulder 26 is such that when the shoulder 26 is pulled into tight mating relation with the axial end face 40 of the bell fitting, by tightening of the nuts 21 to the bolts 24, the O-ring 35 receives limited predetermined radial and axial compression from the opposing female face taper 39, sufficient only to promote effective sealing of the O-ring 35 between the respective female face taper 39 and the surface of the groove 34. It has been found that the O-ring 35 should preferably be of elastomeric material of hardness 70 to 90 durometer. In the present illustration, this ring is of approximately ½-inch cross section.

The secondary seal 15, as dealt with in my copending application is preferably of durometer 40 to 50.

Figure 3:
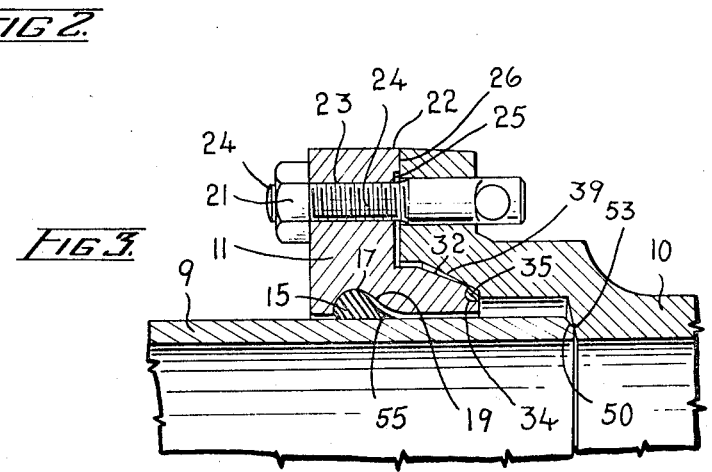
FIG. 3 is a view similar to FIG. 2 showing the assembled combination.

As shown in FIG. 3, in the assembled condition the chamfered nose 50 of the plastic pipe 9 may be held in abutting relation with the shoulder 53 of the fitting 10. This fitting 10 may be a cast iron pipe or a bell adapter portion for a valve or other iron fitting. In certain environments it may be preferable to leave the nose 50 clear of the shoulder 53, to permit axial thermal expansion. It is desirable that pressure fluid from within the pipe 9 and fitting 10 be permitted to act against the portion 55 of the O-ring 15, to provide the desired dynamic sealing to the secondary seal.

While the axial spacing of the adapter 11 relative to the bell fitting 10 is provided by way of an annular shoulder 26 it will be appreciated by those skilled in the art that three or more peripherally spaced spot facings may be utilized to provide the same effect.

It is contemplated that alternative locations for the primary seal O-ring 35 other than on the nose portion 30 may be selected.

Tests have shown that joint adapters manufactured in accordance with the present disclosure are very easy to use in the field, do not require undue skill of installation, and permit a full service life of the so-coupled plastic pipe.

I claim:

1. In combination, a plastic pipe having a spigot end, a transition fitting mountable in sealing relationship with a spigot end, said fitting having a trailing end and a leading end, a central bore through said fitting, an arcuate hydraulic sealing-ring recess in said bore adjacent the trailing end, said arcuate recess being characterized by a relieved surface adjacent the leading end forming a pressure access annulus, a soft hydraulic deformable elastomeric sealing ring mounted in said recess in sealing relationship with the spigot end and the bore recess, the leading end of the transition fitting having a male face taper which is more acute than the opposing female face taper of a mechanical joint bell into which it is to be inserted, a primary sealing-ring recess at the runout of the male face taper and the outer extremity of the leading end, a primary hard elastomeric sealing ring mounted in said primary sealing-ring recess, the trailing end being upset to form a transition fitting mounting flange connectable to the mechanical joint flange of the mechanical joint bell, said mounting flange having an annular shoulder engageable with the outer face of the mechanical joint flange whereby excessive compression of the primary sealing-ring is prevented.

2. A transition fitting mountable in sealing relationship with the spigot end and connectable to a mechanical joint flange of a bell fitting, said transition fitting having a trailing end and a leading end, a central bore through said transition fitting, an arcuate hydraulic sealing-ring recess in said bore adjacent the trailing end for the reception therein of deformable elastomeric sealing ring, said arcuate recess being characterized by a relieved surface adjacent the leading end of the transition fitting forming a pressure access annulus, the leading end of the transition fitting having a male face taper which is more acute than opposing female face taper of the mechanical joint bell into which it is to be inserted, a primary sealing-ring recess at the runout of the male face taper and the outer extremity of the leading end for receiving therein a primary hard elastomeric sealing ring, the trailing end being upset to form a transition fitting mounting flange connectable to the mechanical joint flange of the mechanical joint bell, said transition fitting mounting flange having an annular shoulder engageable with the outer face of the mechanical joint flange whereby when the two flanges are clamped together excessive compression of the primary sealing ring is prevented.

3. A transition fitting according to claim 1 in which the relieved surface has a curvature the reverse of curvature to that of the recess, said curvature being generated on a radius greater than that of the recess.

4. A transition fitting according to claim 2 in which the relieved surface has a curvature the reverse of curvature to that of the recess, said curvature being generated on a radius greater than that of the recess.